United States Patent
Yiu et al.

(10) Patent No.: US 11,778,529 B2
(45) Date of Patent: Oct. 3, 2023

(54) ROBUST HEADER COMPRESSION INDICATION AFTER PATH SWITCH DURING HANDOVER

(71) Applicant: Apple Inc., Cupertino, CA (US)

(72) Inventors: Candy Yiu, Portland, OR (US); Yujian Zhang, Beijing (CN); Yi Guo, Shanghai (CN); Sudeep Palat, Cheltenham (GB)

(73) Assignee: APPLE INC., Cupertino, CA (US)

( * ) Notice: Subject to any disclaimer, the term of this patent is extended or adjusted under 35 U.S.C. 154(b) by 286 days.

(21) Appl. No.: 17/288,394

(22) PCT Filed: Oct. 24, 2019

(86) PCT No.: PCT/US2019/057868
§ 371 (c)(1),
(2) Date: Apr. 23, 2021

(87) PCT Pub. No.: WO2020/092124
PCT Pub. Date: May 7, 2020

(65) Prior Publication Data
US 2021/0385709 A1 Dec. 9, 2021

Related U.S. Application Data

(60) Provisional application No. 62/753,731, filed on Oct. 31, 2018.

(51) Int. Cl.
*H04W 4/00* (2018.01)
*H04W 36/02* (2009.01)
(Continued)

(52) U.S. Cl.
CPC .......... *H04W 36/023* (2013.01); *H04L 69/22* (2013.01); *H04W 12/037* (2021.01);
(Continued)

(58) Field of Classification Search
None
See application file for complete search history.

(56) References Cited

U.S. PATENT DOCUMENTS

2010/0195617 A1  8/2010  Park et al.
2015/0280905 A1  10/2015  Shah
(Continued)

FOREIGN PATENT DOCUMENTS

WO  2016021820 A1  2/2016

OTHER PUBLICATIONS

PCT/US2019/057868, International Search Report and Written Opinion, dated Feb. 14, 2020, 12 pages.

*Primary Examiner* — Zewdu A Beyen
(74) *Attorney, Agent, or Firm* — Dorsey & Whitney LLP

(57) ABSTRACT

Systems, methods, and devices are provided to: perform packet data convergence protocol (PDCP) deciphering of the packets to store deciphered packets in a common buffer; perform PDCP reordering of the deciphered packets in the common buffer to generated a stream or reordered packets; perform robust header compression (ROHC) decompression on the stream of reordered packets; and determine, based on a packet indication, to reset the ROHC decompression, wherein the packet indication comprises a single bit in a PDCP header set to indicate a start of ROHC reset based on a path switch during a handover from a source cell to a target cell.

15 Claims, 13 Drawing Sheets

(51) Int. Cl.
  *H04W 36/00*    (2009.01)
  *H04W 12/037*   (2021.01)
  *H04L 69/22*    (2022.01)
  *H04W 12/10*    (2021.01)

(52) U.S. Cl.
  CPC ....... *H04W 12/10* (2013.01); *H04W 36/0069* (2018.08); *H04W 36/0072* (2013.01)

(56) References Cited

U.S. PATENT DOCUMENTS

2017/0318496 A1    11/2017  Yi et al.
2018/0083688 A1     3/2018  Anil et al.
2019/0268815 A1*    8/2019  Zhu .................... H04W 36/026

\* cited by examiner

ROBUST HEADER COMPRESSION INDICATION AFTER PATH SWITCH DURING HANDOVER

CROSS-REFERENCE TO RELATED APPLICATION(S)

This application is a national stage filing under 35 U.S.C. § 371 of International Patent Application No. PCT/US2019/057868, filed Oct. 24, 2019, which claims the benefit of U.S. Provisional Patent Application No. 62/753,731, filed Oct. 31, 2018, each of which is hereby incorporated by reference herein in its entirety.

TECHNICAL FIELD

This application relates generally to wireless communication systems, and more specifically to simultaneous connectivity handover.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Simultaneous connectivity handover may achieve a goal of 0 millisecond (ms) interruption time both in LTE and NR. One of the architecture options is a non-split bearer. This option may be the same as or similar to that used in enhanced mobile broadband (eMBB). If the non-split bearer architecture is considered, a UE may receive two streams of data (one from a source cell (which may include a serving cell) and one from a target cell during handover (HO).

Figure 1:
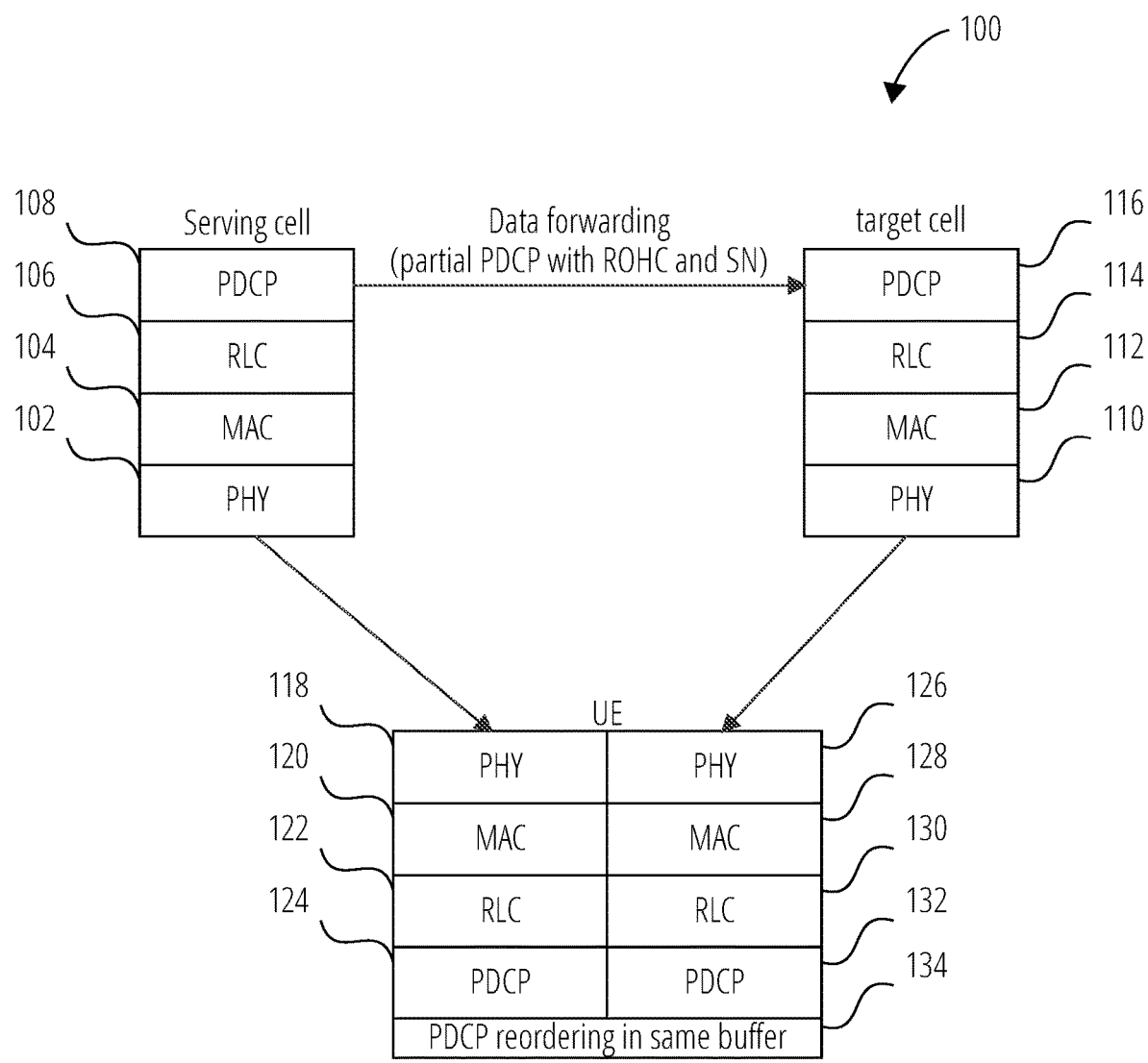
FIG. 1 illustrates protocol stacks in accordance with one embodiment.

For example, FIG. 1 illustrates protocol stacks 100 for a non-split bearer architecture to support simultaneous connectivity handover according to certain embodiments. In particular, FIG. 1 shows a protocol stack for a serving cell including a physical layer (shown as PHY 102), a media access control (MAC) layer (shown as MAC 104), a radio link control (RLC) layer (shown as RLC 106), and a packet data convergence protocol (PDCP) layer (shown as PDCP 108). Similarly, a protocol stack for a target cell includes a PHY 110, a MAC 112, an RLC 114, and a PDCP 116.

Before the handover, the UE may connect only to the source (serving) cell. The UE may communicate with the source cell using a first protocol stack including a PHY 118, a MAC 120, an RLC 122, and a PDCP 124. The UE may be configured to receive a handover command that enables simultaneously connection during handover. Therefore, the UE may have prepared a second protocol stack including a PHY 126, a MAC 128, an RLC 130, and a PDCP 132 to use for communication with the target cell once the UE receives the handover command. During handover, the UE may have completed a random access channel (RACH) procedure with the target cell. Thus, during handover, the UE may be connected with both source cell and target cell.

As shown in FIG. 1, during handover, the source (serving) cell may forward data to the target cell, which the target cell may process and send to the UE. The data forwarded from the source cell to the serving cell may include a partial PDCP protocol data units (PDU) with robust header compression (ROHC) and sequence number (SN). The UE may perform PDCP reordering 134 of PDUs received from both the source cell and the target cell in the same buffer. However, after the path switch is complete from the source cell to the target cell, ROHC decompression by the UE may no longer work because the source cell had initiated and was performing the ROHC compression for packets received from the source cell and the target cell. After the path switch, the target cell performs the ROHC compression for the packets sent to the UE. Thus, the ROHC decompression needs to be reset at the UE 208.

Figure 2:
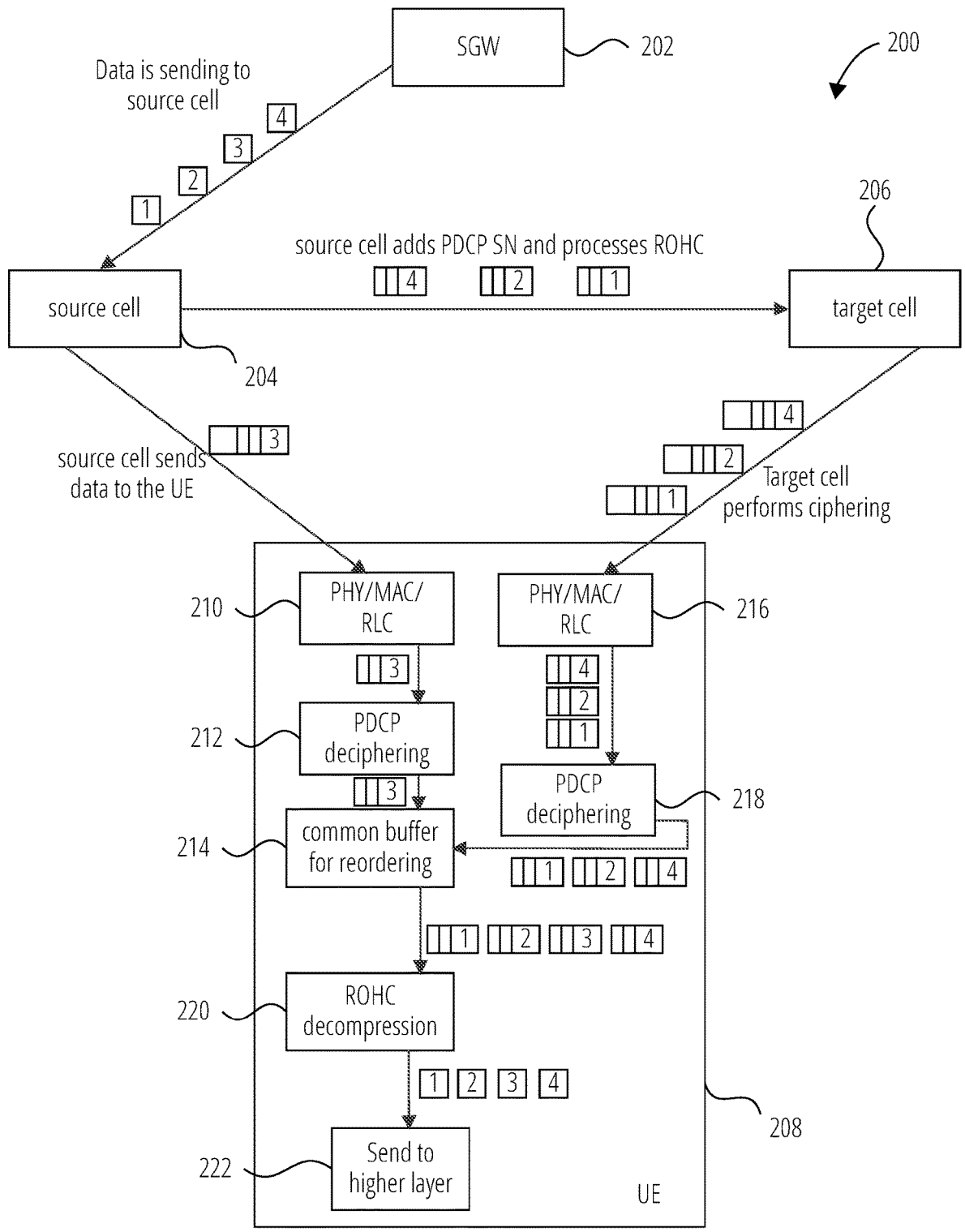
FIG. 2 illustrates security and reordering handling in accordance with one embodiment.

FIG. 2 illustrates security and reordering handling 200 for a non-split bearer architecture according to certain embodiments. In particular, FIG. 2 shows an example of downlink (DL) user plane handover for the non-split bearer architecture.

On the network side, a serving gateway (shown as SGW 202) sends data (shown as data 1, 2, 3, and 4) to a source cell 204. The source cell 204 processes ROHC, if needed, and allocates PDCP SN for each packet. The source cell 204 then forwards the partial PDCP PDU (after ROHC) and the SN to a target cell 206. In addition, or alternatively, the source cell 204 processes integrity protection (for control plane (c-plane) data and performs ciphering before sending at least some of the data to a UE 208.

A PDCP entity of the target cell 206 may only perform integrity protection (for c-plane data) and ciphering on the partial PDCP PDU received from the source cell 204 before sending it to the UE 208.

At the UE receiver side (e.g., after the UE 208 determines a count of the PDCP PDU), the UE 208 may perform separate operations for each link to the source cell 204 and the target cell 206. For data received through the link to the source cell 204, the UE 208 performs PHY/MAC/RLC processing 210 (e.g., as in legacy LTE procedures), performs an integrity protection check (for c-plane data) and PDCP deciphering 212, and stores the packets in a common buffer 214 for reordering. Similarly, for data received through the link to the target cell 206, the UE 208 performs PHY/MAC/RLC processing 216, performs an integrity protection check (for c-plane data) and PDCP deciphering 218, and stores the packets in the common buffer 214 for reordering.

After the UE 208 performs PDCP reordering off the packets in the common buffer 214, the UE 208 performs ROHC decompression 220 and sends 222 the data to a higher layer.

After the path switch, ROHC decompression 220 may not work and may need to be reset. For example, ROHC may include a progressive compression wherein decompression of subsequent packets may depend on earlier packets. Thus, once the ROHC is switched from being performed by the source cell 204 to being performed by the target cell 206, the UE 208 may no longer be able to use information received in earlier packets to decompress current packets. However, legacy implementations do not provide a way to indicate to the UE which packet can start ROHC reset.

Thus, certain embodiments herein provide a ROHC reset indication after the path switch during handover.

Figure 3:
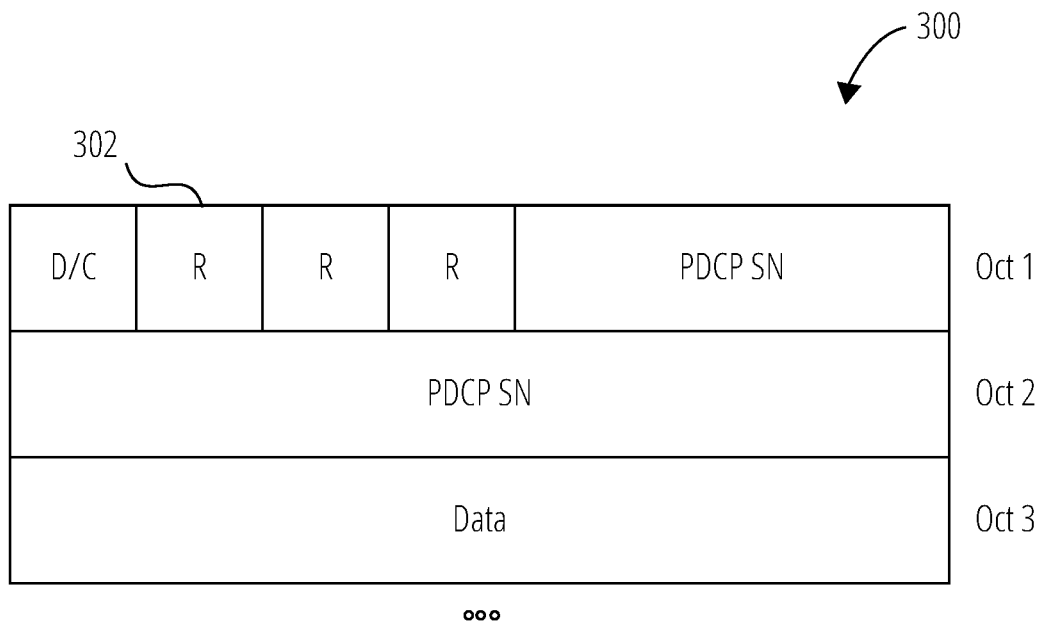
FIG. 3 illustrates a PDCP packet format in accordance with one embodiment.

For example, one embodiment provides a single bit (1-bit) indication in a PDCP header to indicate ROHC reset. FIG. 3 illustrates a PDCP packet format 300 according to one embodiment wherein a reserve bit may be configured as a ROHC reset indicator 302. When the ROHC reset indicator 302 is set, it indicates to the UE that the packet can be used to start ROHC reset. FIG. 3 shows the format of the PDCP data PDU when a 12 bit SN length is used. This format is applicable for PDCP data PDUs carrying data from data radio bearers (DRBs) mapped on RLC AM (acknowledge mode) or RLC UM (unacknowledged mode).

In another embodiment, a new PDCP control PDU may be created to indicate when the ROHC should be reset/initialized.

Figure 4:
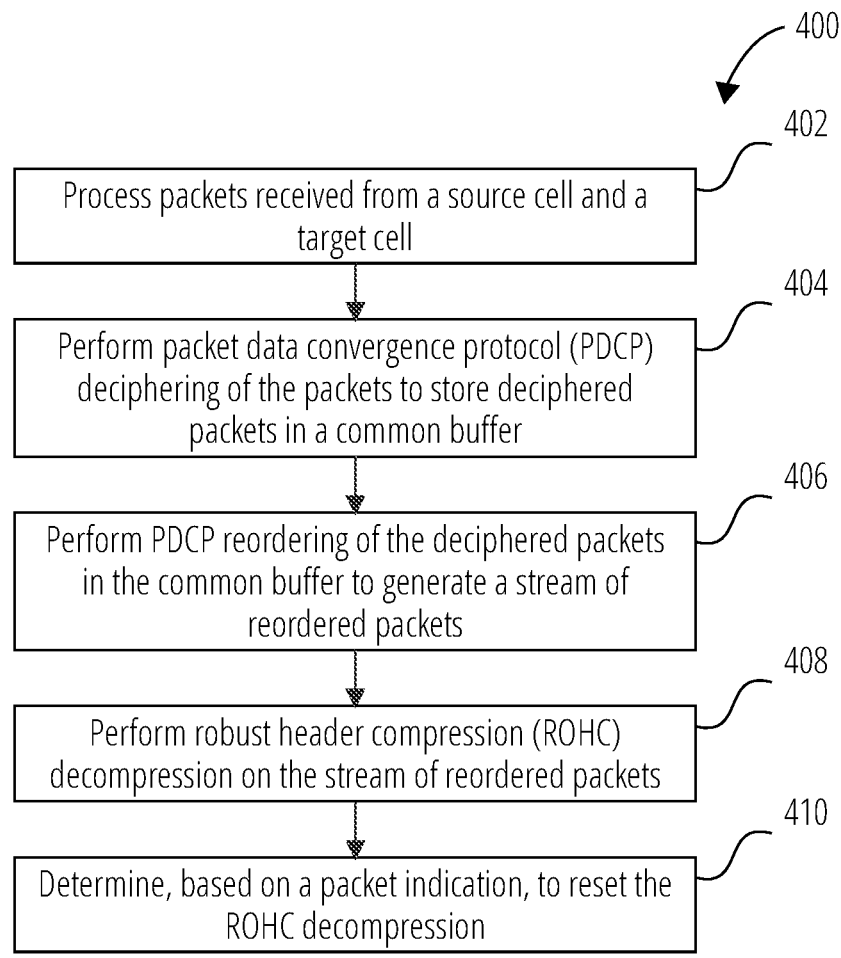
FIG. 4 illustrates a method in accordance with one embodiment.

FIG. 4 illustrates a method 400 for a UE to perform a handover from a source cell to a target cell in a wireless network according to one embodiment. In block 402, the method 400 processes packets received from the source cell and the target cell. In block 404, the method 400 performs packet data convergence protocol (PDCP) deciphering of the packets to store deciphered packets in a common buffer. In block 406, the method 400 performs PDCP reordering of the deciphered packets in the common buffer to generate a stream of reordered packets. In block 408, the method 400 performs robust header compression (ROHC) decompression on the stream of reordered packets. In block 410, the method 400 determines, based on a packet indication, to reset the ROHC decompression.

In one embodiment, the packet indication comprises a single bit in a PDCP header set to indicate a start of ROHC reset based on a path switch during the handover from the source cell to the target cell. The PDCP header may correspond to a PDCP data PDU carrying data from a DRB. The PDCP data PDU may correspond to one of the packets received from the target cell.

In another embodiment, the packet indication comprises a PDCP control PDU configured to indicate a start of ROHC reset.

Figure 5:
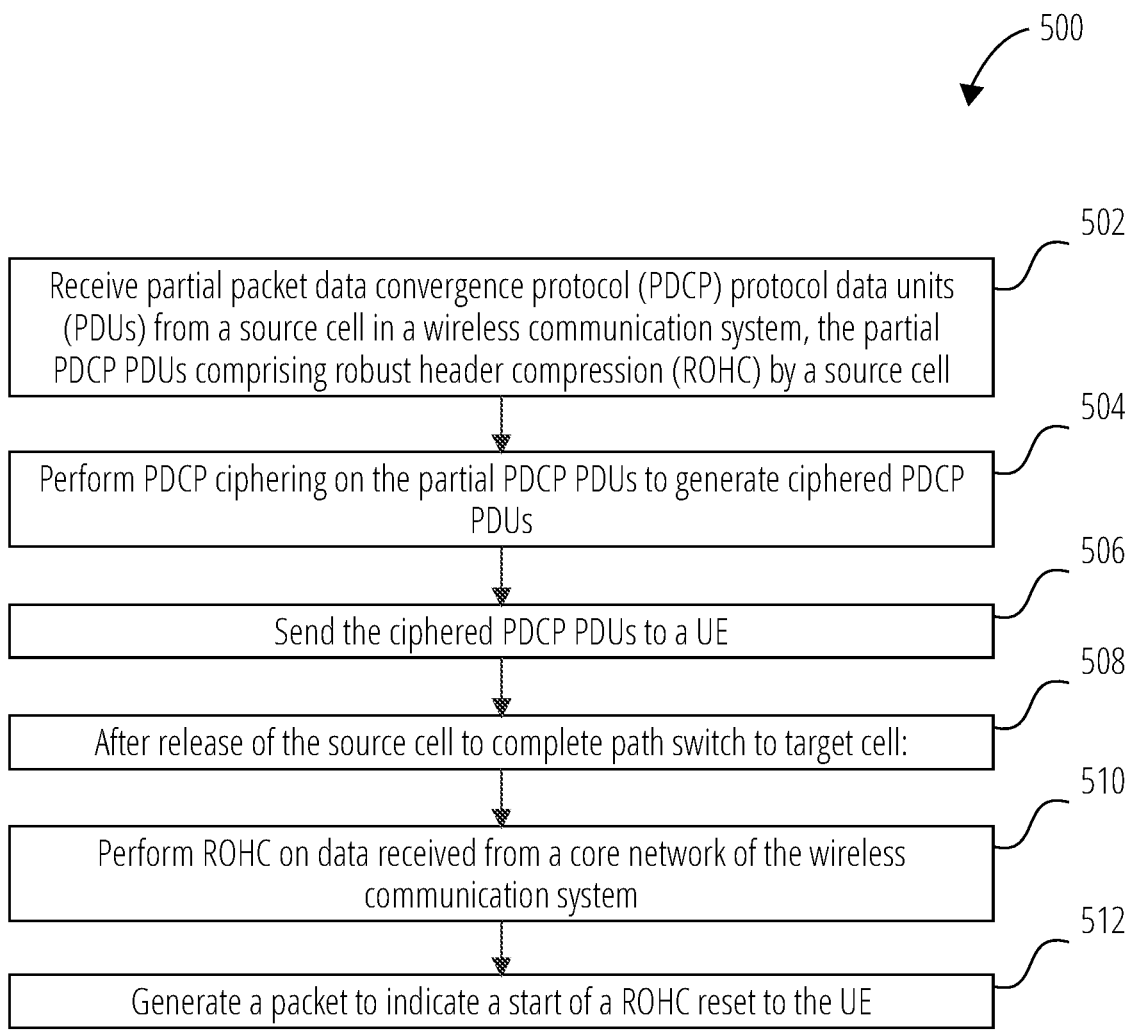
FIG. 5 illustrates a method in accordance with another embodiment.

FIG. 5 illustrates a method 500 for a target cell for handover of a UE in a wireless communication system. In block 502, the method 500 receives partial packet data convergence protocol (PDCP) protocol data units (PDUs) from a source cell in the wireless communication system, the partial PDCP PDUs comprising robust header compression (ROHC) by the source cell. In block 504, the method 500 performs PDCP ciphering on the partial PDCP PDUs to generate ciphered PDCP PDUs. In block 506, the method 500 sends the ciphered PDCP PDUs to the UE. After release of the source cell to complete a path switch to the target cell in block 508, in block 510 the method 500 performs ROHC on data received from a core network of the wireless communication system, and in block 512 the method 500 generates a packet to indicate a start of a ROHC reset to the UE.

In one embodiment, the packet to indicate the start of the ROHC reset comprises a single bit in a PDCP header set to indicate the start of the ROHC reset.

In another embodiment, the packet to indicate the start of the ROHC reset comprises a PDCP control PDU configured to indicate the start of the ROHC reset.

Example Systems and Apparatuses

Figure 6:
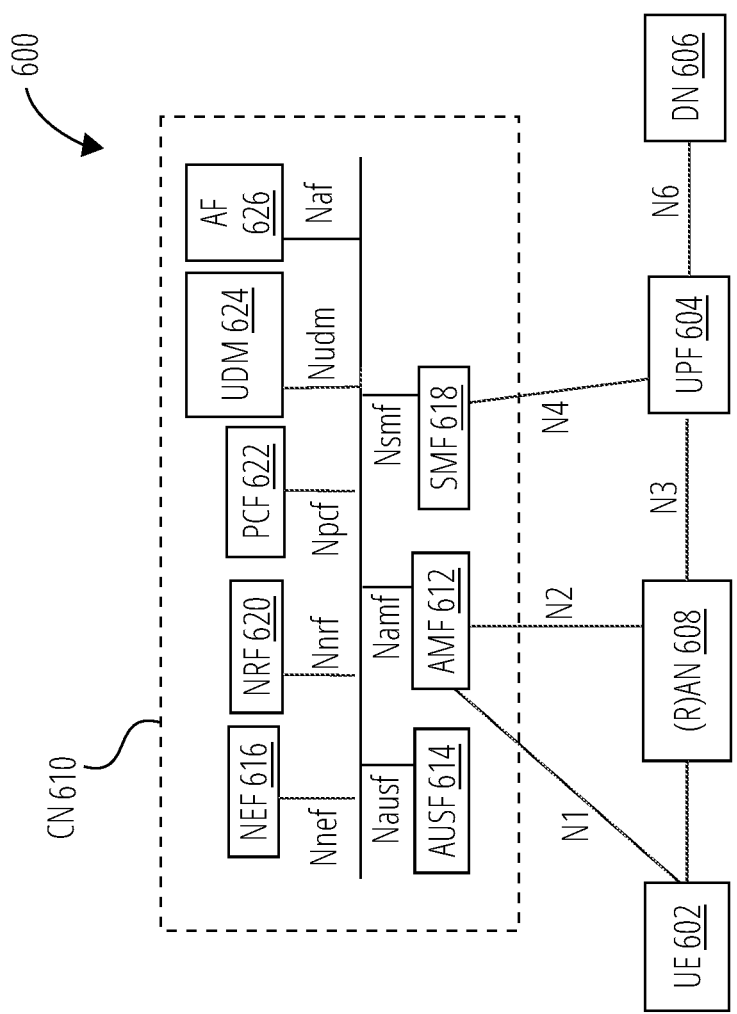
FIG. 6 illustrates a system in accordance with one embodiment.

FIG. 6 illustrates an architecture of a system 600 of a network in accordance with some embodiments. The system 600 is shown to include a UE 602; a 5G access node or RAN node (shown as (R)AN node 608); a User Plane Function (shown as UPF 604); a Data Network (DN 606), which may be, for example, operator services, Internet access or 3rd party services; and a 5G core network (5GC) (shown as CN 610).

The CN 610 may include an Authentication Server Function (AUSF 614); a Core Access and Mobility Management Function (AMF 612); a Session Management Function (SMF 618); a Network Exposure Function (NEF 616); a Policy Control Function (PCF 622); a Network Function (NF) Repository Function (NRF 620); a Unified Data Management (UDM 624); and an Application Function (AF 626). The CN 610 may also include other elements that are not shown, such as a Structured Data Storage network function (SDSF), an Unstructured Data Storage network function (UDSF), and the like.

The UPF 604 may act as an anchor point for intra-RAT and inter-RAT mobility, an external PDU session point of interconnect to DN 606, and a branching point to support multi-homed PDU session. The UPF 604 may also perform packet routing and forwarding, packet inspection, enforce user plane part of policy rules, lawfully intercept packets (UP collection); traffic usage reporting, perform QoS handling for user plane (e.g. Packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 604 may include an uplink classifier to support routing traffic flows to a data network. The DN 606 may represent various network operator services, Internet access, or third party services.

The AUSF 614 may store data for authentication of UE 602 and handle authentication related functionality. The AUSF 614 may facilitate a common authentication framework for various access types.

The AMF 612 may be responsible for registration management (e.g., for registering UE 602, etc.), connection management, reachability management, mobility management, and lawful interception of AMF-related events, and access authentication and authorization. AMF 612 may provide transport for SM messages for the SMF 618, and act as a transparent proxy for routing SM messages. AMF 612 may also provide transport for short message service (SMS) messages between UE 602 and an SMS function (SMSF) (not shown by FIG. 6). AMF 612 may act as Security Anchor Function (SEA), which may include interaction with the AUSF 614 and the UE 602, receipt of an intermediate key that was established as a result of the UE 602 authentication process. Where USIM based authentication is used, the AMF 612 may retrieve the security material from the AUSF 614. AMF 612 may also include a Security Context Management (SCM) function, which receives a key from the SEA that it uses to derive access-network specific keys. Furthermore, AMF 612 may be a termination point of RAN CP interface (N2 reference point), a termination point of NAS (N1) signaling, and perform NAS ciphering and integrity protection.

AMF 612 may also support NAS signaling with a UE 602 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (N1) signaling between the UE 602 and AMF 612, and relay uplink and downlink user-plane packets between the UE 602 and UPF 604. The N3IWF also provides mechanisms for IPsec tunnel establishment with the UE 602.

The SMF 618 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 618 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 616 may provide means for securely exposing the services and capabilities provided by 3GPP network functions for third party, internal exposure/re-exposure, Application Functions (e.g., AF 626), edge computing or fog computing systems, etc. In such embodiments, the NEF 616 may authenticate, authorize, and/or throttle the AFs. NEF 616 may also translate information exchanged with the AF 626 and information exchanged with internal network functions. For example, the NEF 616 may translate between an AF-Service-Identifier and an internal 5GC information. NEF 616 may also receive information from other network functions (NFs) based on exposed capabilities of other network functions. This information may be stored at the NEF 616 as structured data, or at a data storage NF using a standardized interfaces. The stored information can then be re-exposed by the NEF 616 to other NFs and AFs, and/or used for other purposes such as analytics.

The NRF 620 may support service discovery functions, receive NF Discovery Requests from NF instances, and provide the information of the discovered NF instances to the NF instances. NRF 620 also maintains information of available NF instances and their supported services.

The PCF 622 may provide policy rules to control plane function(s) to enforce them, and may also support unified policy framework to govern network behavior. The PCF 622 may also implement a front end (FE) to access subscription information relevant for policy decisions in a UDR of UDM 624.

The UDM 624 may handle subscription-related information to support the network entities' handling of communication sessions, and may store subscription data of UE 602. The UDM 624 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 622. UDM 624 may also support SMS management, wherein an SMS-FE implements the similar application logic as discussed previously.

The AF 626 may provide application influence on traffic routing, access to the Network Capability Exposure (NCE), and interact with the policy framework for policy control. The NCE may be a mechanism that allows the 5GC and AF 626 to provide information to each other via NEF 616, which may be used for edge computing implementations. In such implementations, the network operator and third party services may be hosted close to the UE 602 access point of attachment to achieve an efficient service delivery through the reduced end-to-end latency and load on the transport network. For edge computing implementations, the 5GC may select a UPF 604 close to the UE 602 and execute traffic steering from the UPF 604 to DN 606 via the N6 interface. This may be based on the UE subscription data, UE location, and information provided by the AF 626. In this way, the AF 626 may influence UPF (re)selection and traffic routing. Based on operator deployment, when AF 626 is considered to be a trusted entity, the network operator may permit AF 626 to interact directly with relevant NFs.

As discussed previously, the CN 610 may include an SMSF, which may be responsible for SMS subscription checking and verification, and relaying SM messages to/from the UE 602 to/from other entities, such as an SMS-GMSC/IWMSC/SMS-router. The SMS may also interact with AMF 612 and UDM 624 for notification procedure that the UE 602 is available for SMS transfer (e.g., set a UE not reachable flag, and notifying UDM 624 when UE 602 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 610 may include an Nx interface, which is an inter-CN interface between the MME (e.g., MME(s) 928) and the AMF 612 in order to enable interworking between CN 610 and CN 1106.

Although not shown by FIG. 6, the system 600 may include multiple RAN nodes (such as (R)AN node 608) wherein an Xn interface is defined between two or more (R)AN node 608 (e.g., gNBs and the like) connecting to CN 610, between a (R)AN node 608 (e.g., gNB) connecting to CN 610 and an eNB, and/or between two eNBs connecting to CN 610.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 602 in a connected mode (e.g., CM-CONNECTED) including functionality to manage the UE mobility for connected mode between one or more (R)AN node 608. The mobility support may include context transfer from an old (source) serving (R)AN node 608 to new (target) serving (R)AN node 608; and control of user plane tunnels between old (source) serving (R)AN node 608 to new (target) serving (R)AN node 608.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
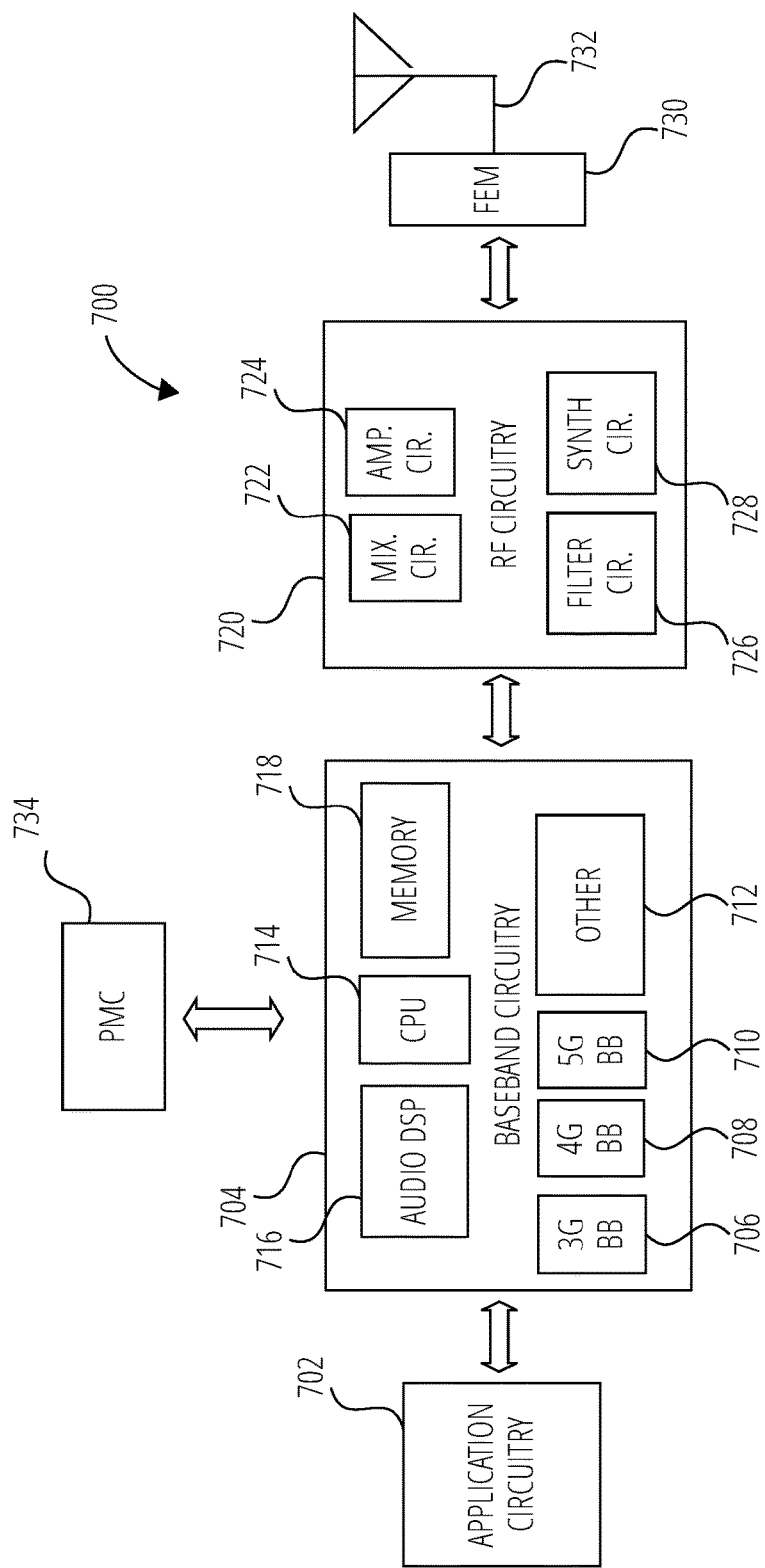
FIG. 7 illustrates a device in accordance with one embodiment.

FIG. 7 illustrates example components of a device 700 in accordance with some embodiments. In some embodiments, the device 700 may include application circuitry 702, baseband circuitry 704, Radio Frequency (RF) circuitry (shown as RF circuitry 720), front-end module (FEM) circuitry (shown as FEM circuitry 730), one or more antennas 732, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 720 and to generate baseband signals for a transmit signal path of the RF circuitry 720. The baseband circuitry 704 may interface with the application circuitry 702 for generation and processing of the baseband signals and for controlling operations of the RF circuitry 720. For example, in some embodiments, the baseband circuitry 704 may include a third generation (3G) baseband processor (3G baseband processor 706), a fourth generation (4G) baseband processor (4G baseband processor 708), a fifth generation (5G) baseband processor (5G baseband processor 710), or other baseband processor(s) 712 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 720. In other embodiments, some or all of the functionality of the illustrated baseband processors may be included in modules stored in the memory 718 and executed via a Central Processing Unit (CPU 714). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 716. The one or more audio DSP(s) 716 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 720 may enable communication with wireless networks using modulated electromagnetic radiation through a non-solid medium. In various embodiments, the RF circuitry 720 may include switches, filters, amplifiers, etc. to facilitate the communication with the wireless network. The RF circuitry 720 may include a receive signal path which may include circuitry to down-convert RF signals received from the FEM circuitry 730 and provide baseband signals to the baseband circuitry 704. The RF circuitry 720 may also include a transmit signal path which may include circuitry to up-convert baseband signals provided by the baseband circuitry 704 and provide RF output signals to the FEM circuitry 730 for transmission.

In some embodiments, the receive signal path of the RF circuitry 720 may include mixer circuitry 722, amplifier circuitry 724 and filter circuitry 726. In some embodiments, the transmit signal path of the RF circuitry 720 may include filter circuitry 726 and mixer circuitry 722. The RF circuitry 720 may also include synthesizer circuitry 728 for synthesizing a frequency for use by the mixer circuitry 722 of the receive signal path and the transmit signal path. In some embodiments, the mixer circuitry 722 of the receive signal path may be configured to down-convert RF signals received from the FEM circuitry 730 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 730. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 of the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 720 may include analog-to-digital converter (ADC) and digital-to-analog converter (DAC) circuitry and the baseband circuitry 704 may include a digital baseband interface to communicate with the RF circuitry 720.

In some dual-mode embodiments, a separate radio IC circuitry may be provided for processing signals for each spectrum, although the scope of the embodiments is not limited in this respect.

In some embodiments, the synthesizer circuitry 728 may be a fractional-N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 720 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 728 of the RF circuitry 720 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 720 may include an IQ/polar converter.

The FEM circuitry 730 may include a receive signal path which may include circuitry configured to operate on RF signals received from one or more antennas 732, amplify the received signals and provide the amplified versions of the received signals to the RF circuitry 720 for further processing. The FEM circuitry 730 may also include a transmit signal path which may include circuitry configured to amplify signals for transmission provided by the RF circuitry 720 for transmission by one or more of the one or more antennas 732. In various embodiments, the amplification through the transmit or receive signal paths may be done solely in the RF circuitry 720, solely in the FEM circuitry 730, or in both the RF circuitry 720 and the FEM circuitry 730.

In some embodiments, the FEM circuitry 730 may include a TX/RX switch to switch between transmit mode and receive mode operation. The FEM circuitry 730 may include a receive signal path and a transmit signal path. The receive signal path of the FEM circuitry 730 may include an LNA to amplify received RF signals and provide the amplified received RF signals as an output (e.g., to the RF circuitry 720). The transmit signal path of the FEM circuitry 730 may include a power amplifier (PA) to amplify input RF signals (e.g., provided by the RF circuitry 720), and one or more filters to generate RF signals for subsequent transmission (e.g., by one or more of the one or more antennas 732).

In some embodiments, the PMC 734 may manage power provided to the baseband circuitry 704. In particular, the PMC 734 may control power-source selection, voltage scaling, battery charging, or DC-to-DC conversion. The PMC 734 may often be included when the device 700 is capable of being powered by a battery, for example, when the device 700 is included in a UE. The PMC 734 may increase the power conversion efficiency while providing desirable implementation size and heat dissipation characteristics.

FIG. 7 shows the PMC 734 coupled only with the baseband circuitry 704. However, in other embodiments, the PMC 734 may be additionally or alternatively coupled with, and perform similar power management operations for, other components such as, but not limited to, the application circuitry 702, the RF circuitry 720, or the FEM circuitry 730.

In some embodiments, the PMC 734 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
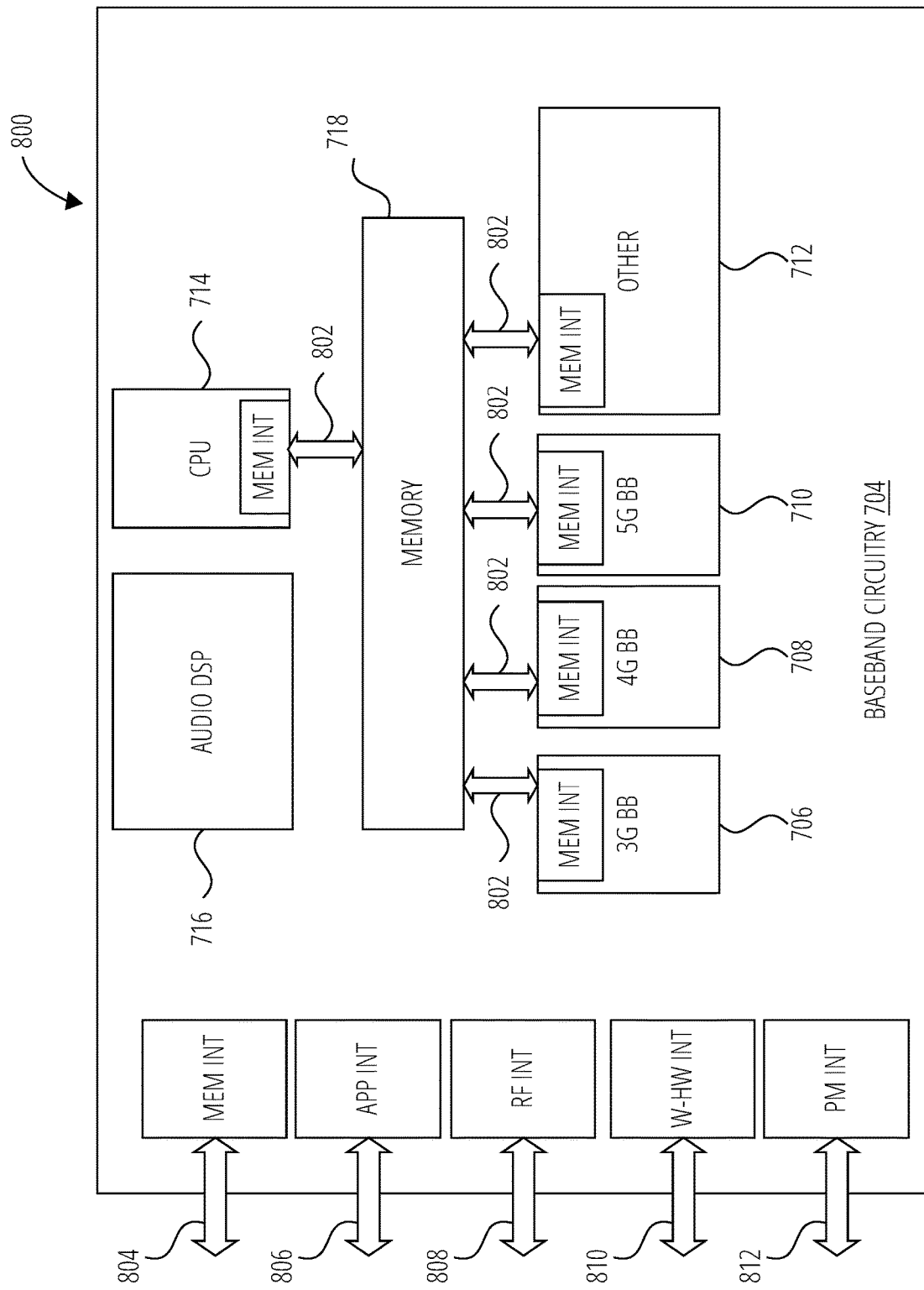
FIG. 8 illustrates example interfaces in accordance with one embodiment.

FIG. 8 illustrates example interfaces 800 of baseband circuitry in accordance with some embodiments. As discussed above, the baseband circuitry 704 of FIG. 7 may comprise 3G baseband processor 706, 4G baseband processor 708, 5G baseband processor 710, other baseband processor(s) 712, CPU 714, and a memory 718 utilized by said processors. As illustrated, each of the processors may include a respective memory interface 802 to send/receive data to/from the memory 718.

The baseband circuitry 704 may further include one or more interfaces to communicatively couple to other circuitries/devices, such as a memory interface 804 (e.g., an interface to send/receive data to/from memory external to the baseband circuitry 704), an application circuitry interface 806 (e.g., an interface to send/receive data to/from the application circuitry 702 of FIG. 7), an RF circuitry interface 808 (e.g., an interface to send/receive data to/from RF circuitry 720 of FIG. 7), a wireless hardware connectivity interface 810 (e.g., an interface to send/receive data to/from Near Field Communication (NFC) components, Bluetooth® components (e.g., Bluetooth® Low Energy), Wi-Fi® components, and other communication components), and a power management interface 812 (e.g., an interface to send/receive power or control signals to/from the PMC 734.

Figure 9:
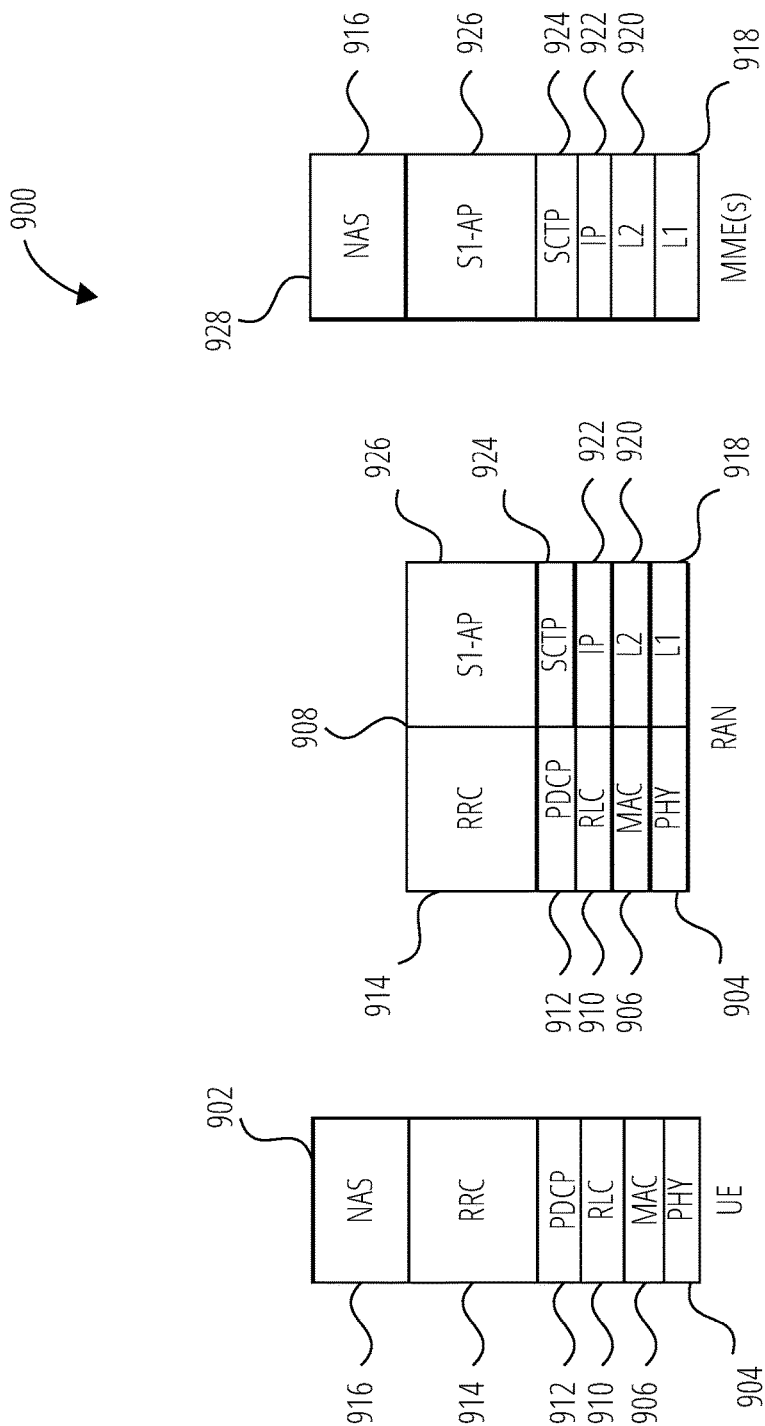
FIG. 9 illustrates a control plane in accordance with one embodiment.

FIG. 9 is an illustration of a control plane protocol stack in accordance with some embodiments. In this embodiment, a control plane 900 is shown as a communications protocol stack between the UE 902, the RAN 908, and the MME(s) 928.

A PHY layer 904 may transmit or receive information used by the MAC layer 906 over one or more air interfaces. The PHY layer 904 may further perform link adaptation or adaptive modulation and coding (AMC), power control, cell search (e.g., for initial synchronization and handover purposes), and other measurements used by higher layers, such as an RRC layer 914. The PHY layer 904 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 906 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 910 may operate in a plurality of modes of operation, including: Transparent Mode (TM), Unacknowledged Mode (UM), and Acknowledged Mode (AM). The RLC layer 910 may execute transfer of upper layer protocol data units (PDUs), error correction through automatic repeat request (ARQ) for AM data transfers, and concatenation, segmentation and reassembly of RLC SDUs for UM and AM data transfers. The RLC layer 910 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 912 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 914 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 902 and the RAN 908 may utilize a Uu interface (e.g., an LTE-Uu interface) to exchange control plane data via a protocol stack comprising the PHY layer 904, the MAC layer 906, the RLC layer 910, the PDCP layer 912, and the RRC layer 914.

In the embodiment shown, the non-access stratum (NAS) protocols (NAS protocols 916) form the highest stratum of the control plane between the UE 902 and the MME(s) 928. The NAS protocols 916 support the mobility of the UE 902 and the session management procedures to establish and maintain IP connectivity between the UE 902 and the P-GW 1008.

The S1 Application Protocol (S1-AP) layer (S1-AP layer 926) may support the functions of the S1 interface and comprise Elementary Procedures (EPs). An EP is a unit of interaction between the RAN 908 and the CN 1106. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The stream Control Transmission Protocol (SCTP) layer (alternatively referred to as the stream control transmission protocol/internet protocol (SCTP/IP) layer) (SCTP layer 924) may ensure reliable delivery of signaling messages between the RAN 908 and the MME(s) 928 based, in part, on the IP protocol, supported by an IP layer 922. An L2 layer 920 and an L1 layer 918 may refer to communication links (e.g., wired or wireless) used by the RAN node and the MME to exchange information.

The RAN 908 and the MME(s) 928 may utilize an S1-MME interface to exchange control plane data via a protocol stack comprising the L1 layer 918, the L2 layer 920, the IP layer 922, the SCTP layer 924, and the S1-AP layer 926.

Figure 10:
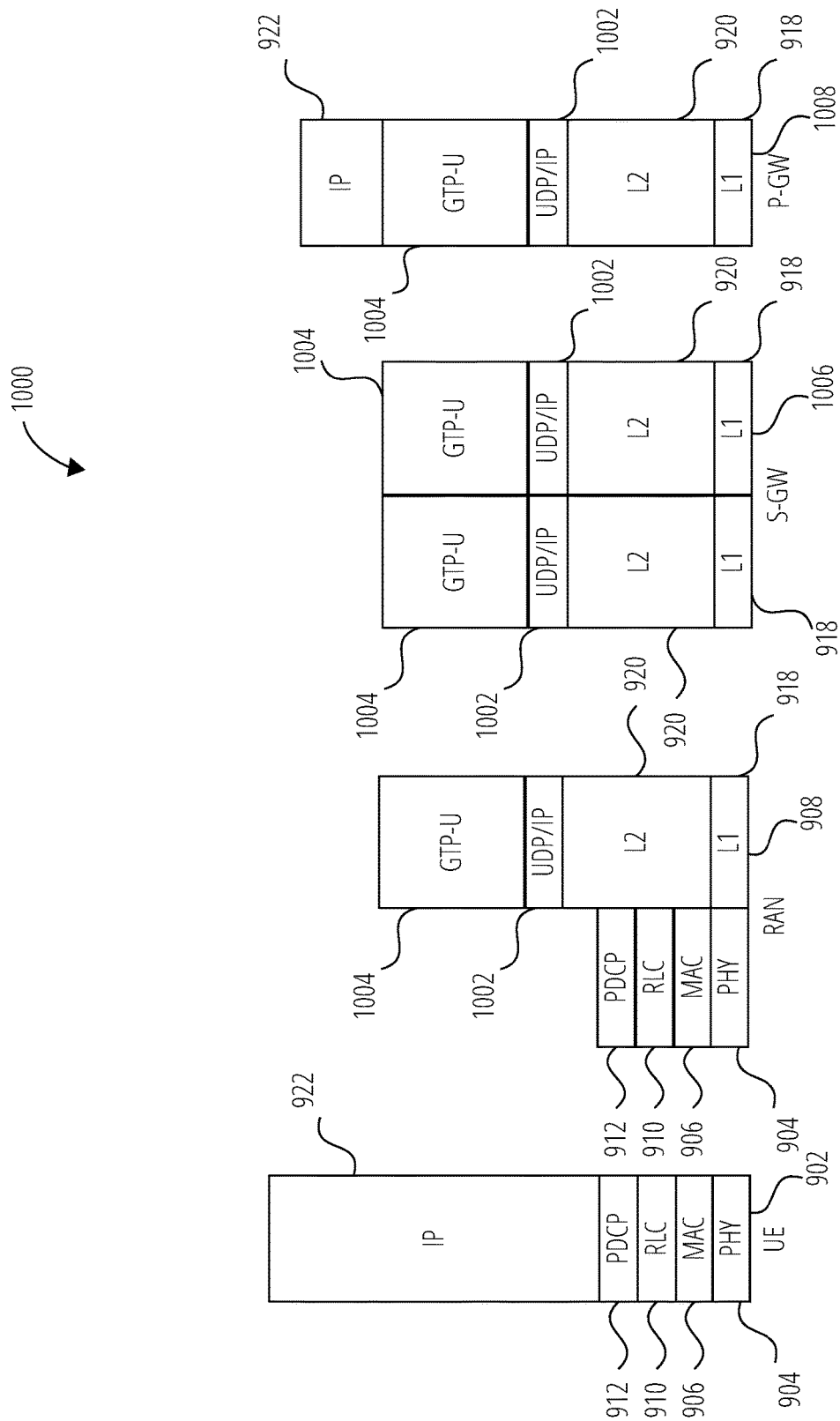
FIG. 10 illustrates a user plane in accordance with one embodiment.

FIG. 10 is an illustration of a user plane protocol stack in accordance with some embodiments. In this embodiment, a user plane 1000 is shown as a communications protocol stack between the UE 902, the RAN 908, the S-GW 1006, and the P-GW 1008. The user plane 1000 may utilize at least some of the same protocol layers as the control plane 900. For example, the UE 902 and the RAN 908 may utilize a Uu interface (e.g., an LTE-Uu interface) to exchange user plane data via a protocol stack comprising the PHY layer 904, the MAC layer 906, the RLC layer 910, the PDCP layer 912.

The General packet Radio Service (GPRS) Tunneling Protocol for the user plane (GTP-U) layer (GTP-U layer 1004) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1002) may provide checksums for data integrity, port numbers for addressing different functions at the source and destination, and encryption and authentication on the selected data flows. The RAN 908 and the S-GW 1006 may utilize an S1-U interface to exchange user plane data via a protocol stack comprising the L1 layer 918, the L2 layer 920, the UDP/IP layer 1002, and the GTP-U layer 1004. The S-GW 1006 and the P-GW 1008 may utilize an S5/S8a interface to exchange user plane data via a protocol stack comprising the L1 layer 918, the L2 layer 920, the UDP/IP layer 1002, and the GTP-U layer 1004. As discussed above with respect to FIG. 9, NAS protocols support the mobility of the UE 902 and the session management procedures to establish and maintain IP connectivity between the UE 902 and the P-GW 1008.

Figure 11:
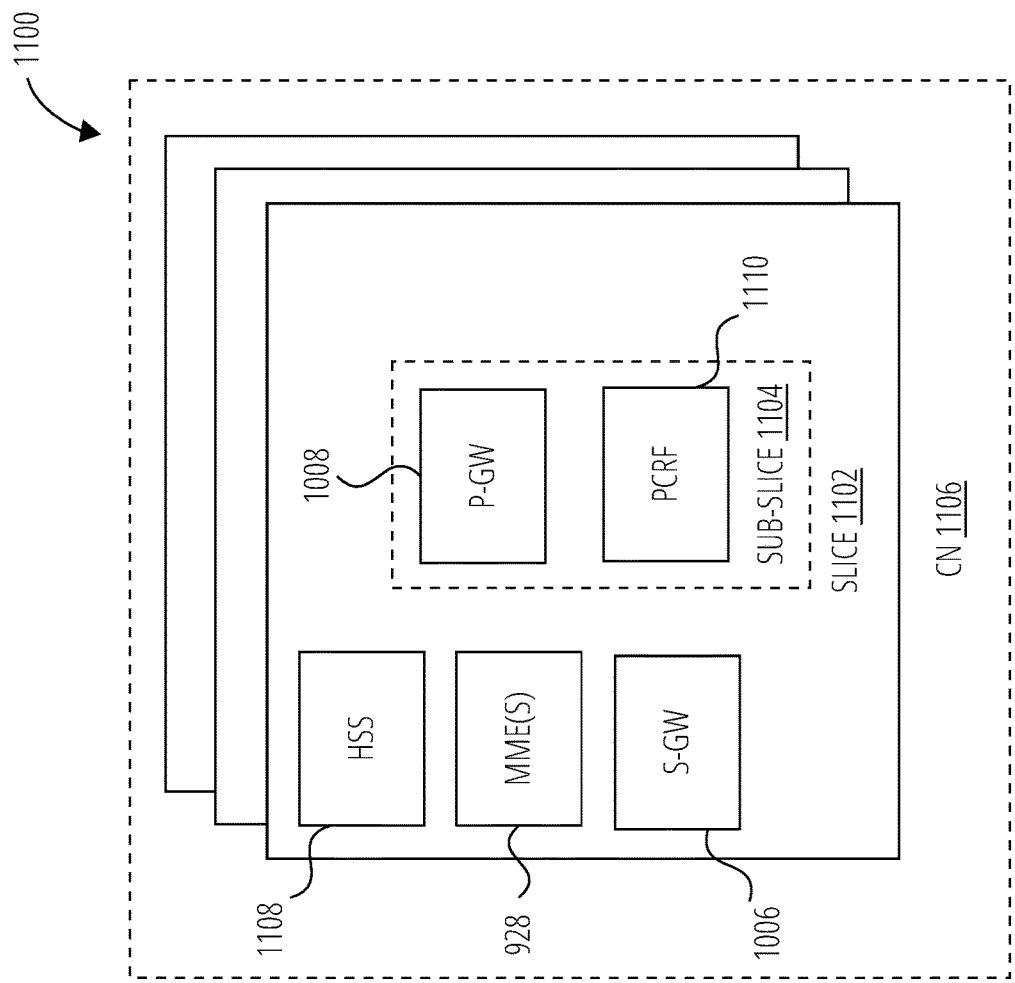
FIG. 11 illustrates components in accordance with one embodiment.

FIG. 11 illustrates components 1100 of a core network in accordance with some embodiments. The components of the CN 1106 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1106 may be referred to as a network slice 1102 (e.g., the network slice 1102 is shown to include the HSS 1108, the MME(s) 928, and the S-GW 1006). A logical instantiation of a portion of the CN 1106 may be referred to as a network sub-slice 1104 (e.g., the network sub-slice 1104 is shown to include the P-GW 1008 and the PCRF 1110).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
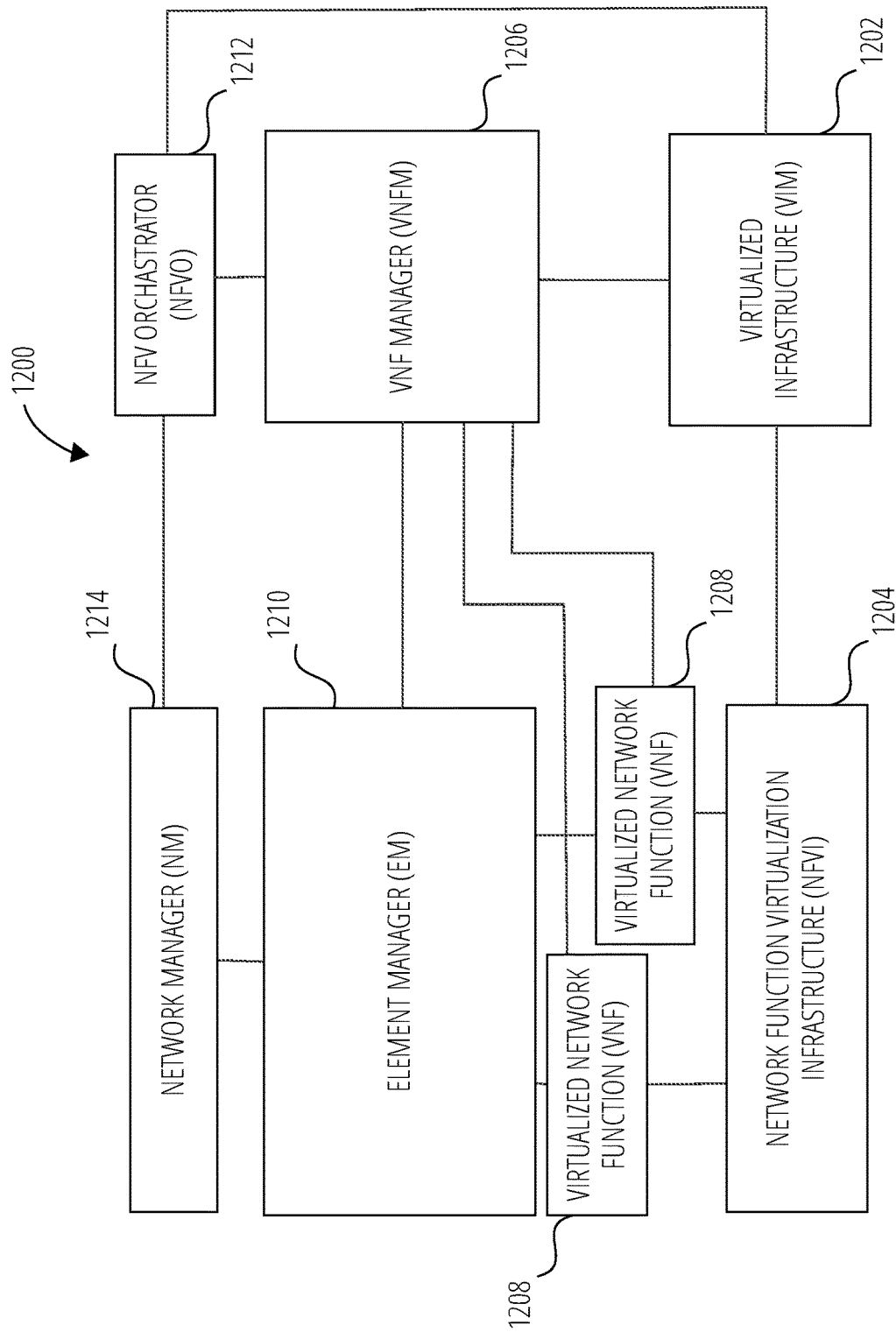
FIG. 12 illustrates a system in accordance with one embodiment.

FIG. 12 is a block diagram illustrating components, according to some example embodiments, of a system 1200 to support NFV. The system 1200 is illustrated as including a virtualized infrastructure manager (shown as VIM 1202), a network function virtualization infrastructure (shown as NFVI 1204), a VNF manager (shown as VNFM 1206), virtualized network functions (shown as VNF 1208), an element manager (shown as EM 1210), an NFV Orchestrator (shown as NFVO 1212), and a network manager (shown as NM 1214).

The VIM 1202 manages the resources of the NFVI 1204. The NFVI 1204 can include physical or virtual resources and applications (including hypervisors) used to execute the system 1200. The VIM 1202 may manage the life cycle of virtual resources with the NFVI 1204 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1206 may manage the VNF 1208. The VNF 1208 may be used to execute EPC components/functions. The VNFM 1206 may manage the life cycle of the VNF 1208 and track performance, fault and security of the virtual aspects of VNF 1208. The EM 1210 may track the performance, fault and security of the functional aspects of VNF 1208. The tracking data from the VNFM 1206 and the EM 1210 may comprise, for example, performance measurement (PM) data used by the VIM 1202 or the NFVI 1204. Both the VNFM 1206 and the EM 1210 can scale up/down the quantity of VNFs of the system 1200.

The NFVO 1212 may coordinate, authorize, release and engage resources of the NFVI 1204 in order to provide the requested service (e.g., to execute an EPC function, component, or slice). The NM 1214 may provide a package of end-user functions with the responsibility for the management of a network, which may include network elements with VNFs, non-virtualized network functions, or both (management of the VNFs may occur via the EM 1210).

Figure 13:
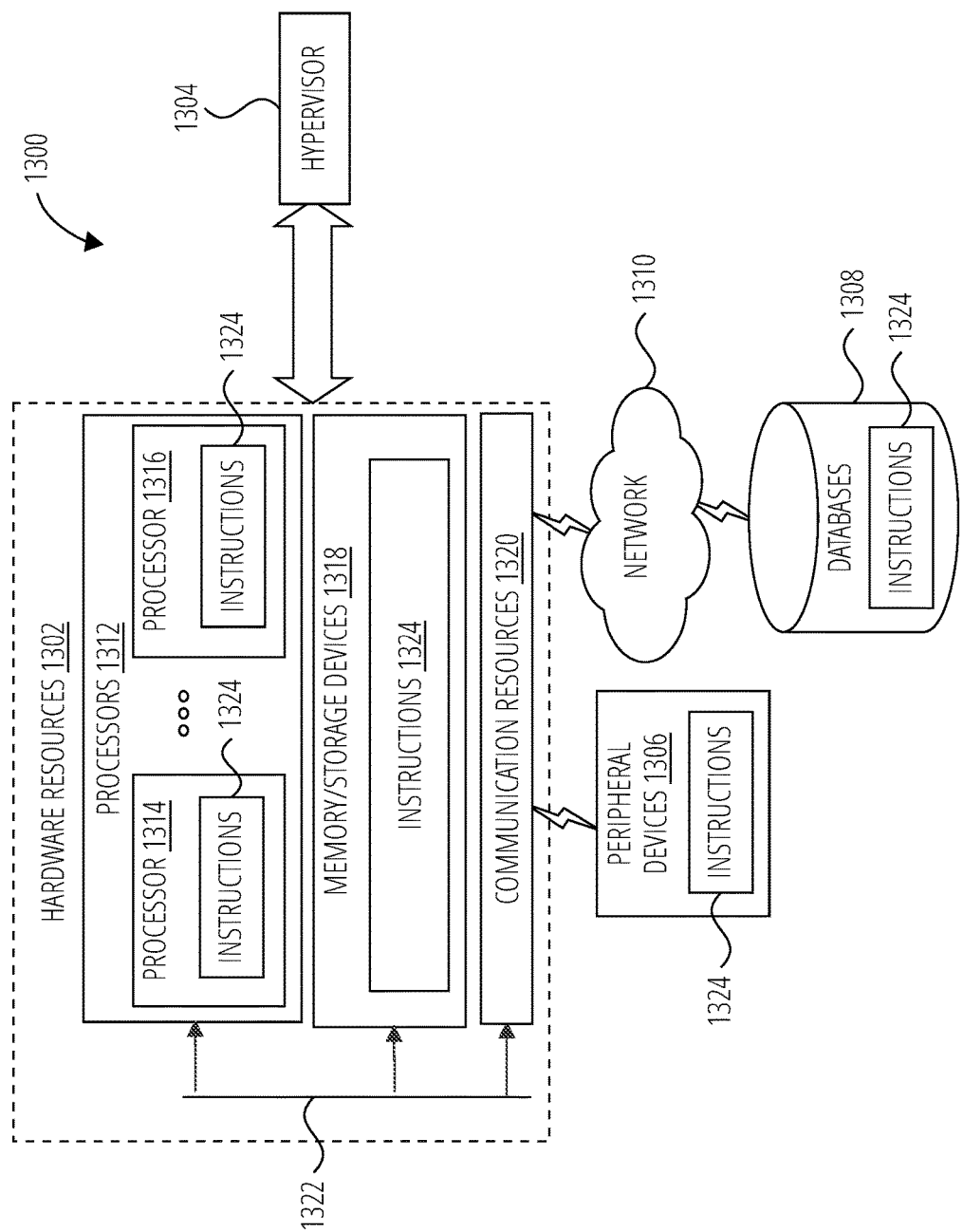
FIG. 13 illustrates components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1312 (or processor cores), one or more memory/storage devices 1318, and one or more communication resources 1320, each of which may be communicatively coupled via a bus 1322. For embodiments where node virtualization (e.g., NFV) is utilized, a hypervisor 1304 may be executed to provide an execution environment for one or more network slices/sub-slices to utilize the hardware resources 1302.

The processors 1312 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316.

The memory/storage devices 1318 may include main memory, disk storage, or any suitable combination thereof. The memory/storage devices 1318 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1320 may include interconnection or network interface components or other suitable devices to communicate with one or more peripheral devices 1306 or one or more databases 1308 via a network 1310. For example, the communication resources 1320 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1324 may comprise software, a program, an application, an applet, an app, or other executable code for causing at least any of the processors 1312 to perform any one or more of the methodologies discussed herein. The instructions 1324 may reside, completely or partially, within at least one of the processors 1312 (e.g., within the processor's cache memory), the memory/storage devices 1318, or any suitable combination thereof. Furthermore, any portion of the instructions 1324 may be transferred to the hardware resources 1302 from any combination of the peripheral devices 1306 or the databases 1308. Accordingly, the memory of the processors 1312, the memory/storage devices 1318, the peripheral devices 1306, and the databases 1308 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is an apparatus for a user equipment (UE) configured to perform a handover from a source cell to a target cell in a wireless network. The apparatus includes a memory interface and a processor. The memory interface is to send or receive, to or from a memory device, packets received from the source cell and the target cell. The processor is to: perform packet data convergence protocol (PDCP) deciphering of the packets to store deciphered packets in a common buffer; perform PDCP reordering of the deciphered packets in the common buffer to generate a stream of reordered packets; perform robust header compression (ROHC) decompression on the stream of reordered packets; and determine, based on a packet indication, to reset the ROHC decompression.

Example 2 includes the apparatus of Example 1, wherein the packet indication comprises a single bit in a PDCP header set to indicate a start of ROHC reset based on a path switch during the handover from the source cell to the target cell.

Example 3 includes the apparatus of Example 2, wherein the PDCP header corresponds to a PDCP data protocol data unit (PDU) carry data from a data radio bearer (DRB).

Example 4 includes the apparatus of Example 3, wherein the PDCP data PDU corresponds to one of the packets received from the target cell.

Example 5 includes the apparatus of Example 1, wherein the packet indication comprises a PDCP control protocol data unit (PDU) configured to indicate a start of ROHC reset.

Example 6 includes the apparatus of Example 5, wherein the processor is further configured to perform physical (PHY) layer, media access control (MAC) layer, and radio link control (RLC) layer processes simultaneously on both a first set of packets received from the source cell and a second set of packets received from the target cell.

Example 7 includes the apparatus of Example 6, wherein the processor is further configured to perform an integrity protection check for control plane packets received from at least one of the source cell and the target cell.

Example 8 is a non-transitory computer-readable storage medium. The computer-readable storage medium includes instructions that when executed by a processor of a user equipment, cause the processor to: process packets received from a source cell and a target cell; perform packet data convergence protocol (PDCP) deciphering of the packets to store deciphered packets in a common buffer; perform PDCP reordering of the deciphered packets in the common buffer to generate a stream of reordered packets; perform robust header compression (ROHC) decompression on the stream of reordered packets; and determine, based on a packet indication, to reset the ROHC decompression.

Example 9 includes the computer-readable storage medium of Example 8, wherein the packet indication comprises a single bit in a PDCP header set to indicate a start of ROHC reset based on a path switch during handover from the source cell to the target cell.

Example 10 includes the computer-readable storage medium of Example 9, wherein the PDCP header corresponds to a PDCP data protocol data unit (PDU) carry data from a data radio bearer (DRB).

Example 11 includes the computer-readable storage medium of Example 10, wherein the PDCP data PDU corresponds to one of the packets received from the target cell.

Example 12 includes the computer-readable storage medium of Example 8, wherein the packet indication comprises a PDCP control protocol data unit (PDU) configured to indicate a start of ROHC reset.

Example 13 includes the computer-readable storage medium of Example 12, wherein to process the packets received from the source cell and the target cell comprises to perform physical (PHY) layer, media access control (MAC) layer, and radio link control (RLC) layer processes simultaneously on both a first set of packets received from the source cell and a second set of packets received from the target cell.

Example 14 includes the computer-readable storage medium of Example 13, wherein the instructions further configure the processor to perform an integrity protection check for control plane packets received from at least one of the source cell and the target cell.

Example 15 is a non-transitory computer-readable storage medium. The computer-readable storage medium includes instructions that when executed by a processor of a target cell in a wireless communication system, cause the processor to: receive partial packet data convergence protocol (PDCP) protocol data units (PDUs) from a source cell in the wireless communication system, the partial PDCP PDUs comprising robust header compression (ROHC) by the source cell; perform PDCP ciphering on the partial PDCP PDUs to generate ciphered PDCP PDUs; and send the ciphered PDCP PDUs to a user equipment (UE). After release of the source cell to complete a path switch to the target cell, the instructions cause the processor to: perform ROHC on data received from a core network of the wireless communication system; and generate a packet to indicate a start of a ROHC reset to the UE.

Example 16 includes the computer-readable storage medium of Example 15, wherein the packet to indicate the start of the ROHC reset comprises a single bit in a PDCP header set to indicate the start of the ROHC reset.

Example 17 includes the computer-readable storage medium of Example 15, wherein the packet to indicate the start of the ROHC reset comprises a PDCP control PDU configured to indicate the start of the ROHC reset.

Example 18 includes the computer-readable storage medium of Example 17, wherein the instructions further configure the processor to perform integrity protection for control plane data of the partial PDCP PDUs.

Example 19 is a method for a target cell for handover of a user equipment (UE) in a wireless communication system. The method includes: receiving partial packet data convergence protocol (PDCP) protocol data units (PDUs) from a source cell in the wireless communication system, the partial PDCP PDUs comprising robust header compression (ROHC) by the source cell; performing PDCP ciphering on the partial PDCP PDUs to generate ciphered PDCP PDUs; and sending the ciphered PDCP PDUs to the UE. After release of the source cell to complete a path switch to the target cell, the method further includes: performing ROHC on data received from a core network of the wireless communication system; and generating a packet to indicate a start of a ROHC reset to the UE.

Example 20 includes the method of Example 19, wherein the packet to indicate the start of the ROHC reset comprises a single bit in a PDCP header set to indicate the start of the ROHC reset.

Example 21 includes the method of Example 19, wherein the packet to indicate the start of the ROHC reset comprises a PDCP control PDU configured to indicate the start of the ROHC reset.

Example 22 includes the method of Example 21, further comprising performing integrity protection for control plane data of the partial PDCP PDUs.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE) configured to perform a handover from a source cell to a target cell in a wireless network, the apparatus comprising:
    a memory interface to send or receive, to or from a memory device, packets received from the source cell and the target cell; and
    a processor to:
    perform packet data convergence protocol (PDCP) deciphering of the packets to store deciphered packets in a common buffer;
    perform PDCP reordering of the deciphered packets in the common buffer to generate a stream of reordered packets;
    perform robust header compression (ROHC) decompression on the stream of reordered packets; and
    determine, based on a packet indication, to reset the ROHC decompression, wherein the packet indication comprises a single bit in a PDCP header set to indicate a start of ROHC reset based on a path switch during the handover from the source cell to the target cell.

2. The apparatus of claim 1, wherein the PDCP header corresponds to a PDCP data protocol data unit (PDU) carry data from a data radio bearer (DRB).

3. The apparatus of claim 2, wherein the PDCP data PDU corresponds to one of the packets received from the target cell.

4. The apparatus of claim 1, wherein the packet indication comprises a PDCP control protocol data unit (PDU) configured to indicate the start of ROHC reset.

5. The apparatus of claim 4, wherein the processor is further configured to perform physical (PHY) layer, media access control (MAC) layer, and radio link control (RLC) layer processes simultaneously on both a first set of packets received from the source cell and a second set of packets received from the target cell.

6. The apparatus of claim 5, wherein the processor is further configured to perform an integrity protection check for control plane packets received from at least one of the source cell and the target cell.

7. A non-transitory computer-readable storage medium, the computer-readable storage medium including instructions that when executed by a processor of a user equipment, cause the processor to:
    process packets received from a source cell and a target cell;
    perform packet data convergence protocol (PDCP) deciphering of the packets to store deciphered packets in a common buffer;
    perform PDCP reordering of the deciphered packets in the common buffer to generate a stream of reordered packets;
    perform robust header compression (ROHC) decompression on the stream of reordered packets; and
    determine, based on a packet indication, to reset the ROHC decompression, wherein the packet indication comprises a single bit in a PDCP header set to indicate a start of ROHC reset based on a path switch during handover from the source cell to the target cell.

8. The computer-readable storage medium of claim 7, wherein the PDCP header corresponds to a PDCP data protocol data unit (PDU) carry data from a data radio bearer (DRB).

9. The computer-readable storage medium of claim 8, wherein the PDCP data PDU corresponds to one of the packets received from the target cell.

10. The computer-readable storage medium of claim 7, wherein the packet indication comprises a PDCP control protocol data unit (PDU) configured to indicate the start of ROHC reset.

11. The computer-readable storage medium of claim 10, wherein to process the packets received from the source cell and the target cell comprises to perform physical (PHY) layer, media access control (MAC) layer, and radio link control (RLC) layer processes simultaneously on both a first set of packets received from the source cell and a second set of packets received from the target cell.

12. The computer-readable storage medium of claim 11, wherein the instructions further configure the processor to perform an integrity protection check for control plane packets received from at least one of the source cell and the target cell.

13. A non-transitory computer-readable storage medium, the computer-readable storage medium including instructions that when executed by a processor of a target cell in a wireless communication system, cause the processor to:
    receive partial packet data convergence protocol (PDCP) protocol data units (PDUs) from a source cell in the wireless communication system, the partial PDCP PDUs comprising robust header compression (ROHC) by the source cell;
    perform PDCP ciphering on the partial PDCP PDUs to generate ciphered PDCP PDUs;
    send the ciphered PDCP PDUs to a user equipment (UE); and
    after release of the source cell to complete a path switch to the target cell:
    perform ROHC on data received from a core network of the wireless communication system; and
    generate a packet to indicate a start of a ROHC reset to the UE, wherein the packet to indicate the start of the ROHC reset comprises a single bit in a PDCP header set to indicate the start of the ROHC reset.

14. The computer-readable storage medium of claim 13, wherein the packet to indicate the start of the ROHC reset comprises a PDCP control PDU configured to indicate the start of the ROHC reset.

15. The computer-readable storage medium of claim 14, wherein the instructions further configure the processor to perform integrity protection for control plane data of the partial PDCP PDUs.

\* \* \* \* \*